(12) United States Patent
Copenhaver et al.

(10) Patent No.: US 6,178,014 B1
(45) Date of Patent: *Jan. 23, 2001

(54) METHODS FOR ILLUMINATING DOCUMENTS

(75) Inventors: Gary B. Copenhaver, Canton; Clive E. Catchpole, Birmingham; Johan P. Bakker, West Bloomfield; John D. Vala, Plymouth; David J. Concannon, Farmington Hills, all of MI (US)

(73) Assignee: Unisys Corporation, Blue Bell, PA (US)

( * ) Notice: Under 35 U.S.C. 154(b), the term of this patent shall be extended for 0 days.

This patent is subject to a terminal disclaimer.

(21) Appl. No.: 09/010,287

(22) Filed: Jan. 21, 1998

Related U.S. Application Data

(62) Division of application No. 08/643,393, filed on May 6, 1996, now Pat. No. 5,717,504, which is a division of application No. 08/486,489, filed on Jun. 7, 1995, now Pat. No. 5,519,513, which is a division of application No. 08/192,964, filed on Feb. 7, 1994, now Pat. No. 5,453,849.

(51) Int. Cl.[7] ............................... H04N 1/04; H01J 5/16; F21V 7/00

(52) U.S. Cl. ..................... 358/475; 358/484; 362/297; 362/310; 362/346; 359/584; 313/114

(58) Field of Search .................... 358/475, 484; 359/584; 362/297, 310, 346; 313/114; 250/208.1

(56) References Cited

U.S. PATENT DOCUMENTS

| | | | | |
|---|---|---|---|---|
| 4,868,383 | * | 9/1989 | Kurtz et al. | 250/228 |
| 5,079,678 | * | 1/1992 | Parker | 362/84 |
| 5,155,776 | * | 10/1992 | Concannon et al. | 382/135 |

* cited by examiner

Primary Examiner—Kimberly A. Williams
(74) Attorney, Agent, or Firm—Rocco L. Adornato; Mark T. Starr; John J. McCormack

(57) ABSTRACT

An arrangement for illuminating objects wherein a large number of objects are rapidly and continuously transported past one or more stations, each illuminated by a cylindrical, integrating Lambertian reflecting/diffusing cavity having one or more like light sources therein so as to generate and project a highly intense, highly uniform and highly diffuse beam of illumination, while incorporating optical guide means to couple said illumination beam to the face of the objects at said station and to couple the reflected image of the object back to the cavity.

4 Claims, 9 Drawing Sheets

METHODS FOR ILLUMINATING DOCUMENTS

This is a Division of U.S. Ser. No. 08/643,393, filed May 6, 1996, now U.S. Pat. No. 5,717,504, which is a Division of U.S. Ser. No. 08/486,489 filed Jun. 7, 1995, now U.S. Pat. No. 5,519,513 which is a Division of application Ser. No. 08/192,964, filed Feb. 7, 1994 now U.S. Pat. No. 5,453,849.

FIELD OF INVENTION

This invention relates to arrangements for illuminating objects, and particularly to such involving an integrating cylinder and associated illumination-coupling means.

BACKGROUND, FEATURES

Workers in the field of illumination are aware that the art of illuminating objects (e.g. for imaging thereof) is proceeding apace, with increasing need to more effectively provide intense lighting which is nonetheless diffused and uniform across a field of view, while also being cost-effective and free of harmful thermal effects.

This invention provides an illumination system that can be useful with an electronic image-capture system, giving a combined platform apt for integration in a high-speed processor. This platform provides the ability to capture a video image of an object as it passes through the processor at full speed, and direct the captured image data to additional electronics which process and compress the captured data. The data may then he stored in storage and retrieval systems where it may be accessed for further manipulation and processing, displayed on video workstations, printed (typically using high-definition laser printers), transmitted electronically from point to point, placed in an archive system where it may be stored for long periods, or any combination of these processes as defined by the system parameters. Such processes, or combinations of processes, are typically controlled by mainframe computers which act as "host" systems to link multiple imaging systems, storage and retrieval systems and other peripherals.

The transport systems for which this imaging platform is contemplated are capable of transporting objects past processing stations at speeds between 100 to 400 inches per second (ips, or 2.54 to 10.16 meters per second mps). The objects, with a typical thickness of 0.005 inches (0.125 millimeters) move along a vertical constraining channel known as a "track," having a width of typically 0.070 to 0.090 inches (1.78 to 2.29 millimeters), known as the "track gap". This "track gap" is made considerably wider than the width of the object to accommodate variations due to tolerances and also to accommodate foreign objects (e.g. documents with staples, paper-clips and the like) which inevitably are attached to such objects from time to time. While this "wide" track gap is necessary for reliable transport of documents, it creates an additional problem or depth of field for a potential video imaging system. Such system must be able to capture an image of the object (e.g. a sharp focus and with correct illumination no matter where it happens to be located within the track gap. The location of the object within the track gap may also change from point to point within the length of a single object.

The field of view to be captured by an imaging such as the one described here is largely defined by the maximum height of the objects (e.g. documents) which must be captured. The objects here contemplated (checks and like financial instruments) are typically between 2.75 to 4.75 inches (70.0 to 121.0 millimeters) high and between 6.0 and 10.0 inches (152.0 and 254.0 millimeters) long.

Image capture is achieved by passing the object in front of a photosensitive device known as a CCPD, well known to workers in the art. This consists of a large number of very small, individual photosensitive receptors, disposed in a linear array. The object is passed in front of the CCPD as a natural function of the object transport, and a complete image of the object linear segments individually captured from the CCPD, a process known in the art as "line scanning".

The photoreceptors of the CCPD consist of a semiconductor material which is formulated to convert incident light into an analogue electrical signal, which varies in potential depending upon the intensity of the incident light. The captured image thus consists of many individual records from each receptor, known as "pixies", each having a particular analogue potential which corresponds to the intensity of the incident light during the time the individual record was captured.

The time available for a receptor to capture this data is very short. In the preferred embodiment, and in other embodiments described e.g. in U.S. Pat. Nos. 5,063,599, 5,003,189, 5,063,461, 5,155,776, 5,144,457, 5,259,053 and 5,255,107, the document transport velocity is 300 ips (7.62 mps) and the preferred perceived size of an individual pixel is 0.005" (0.125 millimeters) square. So the time available for the individual receptor to capture the data related to a particular pixel is 0.005÷300 or approximately 17 millionths of a second (17 microseconds). At the maximum velocity (of which the preferred embodiment is capable), this time may be as brief as 12.5 microseconds. This time is known to workers in the art as "integration time", since it describes the time available for the photosensitive receptor to gather all the photons which have struck its surface and integrate their energy to produce an analog potential (i.e. electronic image).

The CCPD of choice in the preferred embodiment is the Reticon RL1228D, a linear array device contained in the familiar "chip" -style package, which contains sufficient receptors to allow us to image said documents at the preferred pixel size and can maintain the necessary data rates (up to 80 megabytes per second) to permit imaging at the preferred document speeds. This device is commercially available and attractively priced.

It will thus be seen that the selection of the type and intensity of the document illumination system is very critical and must be closely matched to the physical parameters of the document transport and the electronic characteristics of the CCPD which is to be employed. The illumination system must provide enough light to produce adequate signal from the CCPD under the worst possible conditions for document, transport, CCPD, optics and processing electronics. The illumination system should also provide lighting which is uniform over the entire surface of the document to be imaged, in order that the CCPD may provide a consistent response for a given condition at different points on the document. The illumination must also be correctly devised to accurately render the colour and contrast of the document, since the CCDP is a monochrome device which will render images only in shades of grey. An object hereof is to teach a means of deriving such illumination.

Because of the potential archival nature of the captured image and the many possible uses to which it will be put, a very high standard of legibility must be applied. We expect to satisfy the "eyeball test"—that is, what is visible on the document must be visible in the image. While later electronic processing can remove or suppress selected information, it cannot synthesize data which was not originally captured. Therefore, the illumination must be of sufficient intensity to faithfully render all significant on the document at the same intensities and contrasts as would be observed with the human eye.

Conversely, the image should not contain data which is not visible to the human eye; this might tend to confuse or obscure the imaged data which is human-visible. For this reason, the illumination must also be spectrally correct, taking into consideration the spectral response of the CCPD (which does not necessarily mimic that of the human eye) and the effects of any optical elements used in the image camera. This combined response must approximate the response of the human eye, known to workers in the art as "photopic response." Failure to match this response may result in startling artifacts in the captured image, such as images of inks or imprints which are not visible to the human eye but are perceived by the CCPD as a result of its own spectral response, or the spectral characteristics of the illumination, or both. Such artifacts are particularly common with the increasing use of security-motivated imprints and watermarks which are invisible to the unaided eye but which will fluoresce in the visible spectrum when illuminated at extra-photopic frequencies, such as ultra-violet light.

Although the photopic response is the "baseline" for which we aim, it has been found that certain carefully-designed alterations to the spectral response of the camera system can enhance the photopic response without adding or subtracting data from the image. For example, a slight adjustment of the spectral response to the red end of the visible spectrum, combined with modifications to the response curve edge rates, will enhance contrast and legibility of documents printed in multiple similar shades of red ink. Similar adjustments may be used to enhance other specific document styles, as will be well understood by workers in the art, and may be aided by filter means (e.g. see FiL below).

One drawback of our preferred CCPD device is the size of the photosensitive array, which is of the order of 0.6 inches (15.0 millimeters) long. Since the document may be up to 4.75 inches (121 millimeters) high, an optical system, including a lens, is required to reduce the image from the height of the document to fit upon the CCPD. The optical system for capturing the image from the document thus becomes somewhat more complex, and is generally referred to as a "camera".

For reasons of stability, ease of construction and cost, we prefer to combine the illumination system and the image camera into a single unit (an IMAGER) which can be more easily integrated into an existing document processing system. Where we want to capture images of both the front and rear of a document simultaneously as it passes through the system, two such illumination/camera units are required, and we prefer to further combine both units into a single IMAGER module, which contains complete illumination systems and imaging optics/CCPDs for both front and rear faces of the document (e.g. see IMAGER embodiment of FIGS. 2–6). An important goal is to make the parts of the two illumination systems and cameras identical so far as possible.

Dust

Workers in the art will be familiar with some of the problems encountered when integrating optical systems into high-speed document processing machinery. The area of the document track and the associated machinery to drive the documents (belts, pulleys, rollers, shafts, motors and the like) are typically laden with dust. The dust is produced by the documents themselves, which shed fibers from the friction of driving elements and from sheared and cut document edges, and from the many high-speed drive elements such as belts and rollers, which tend to shed rubber and metal particles under continual friction with driven paper (which is highly abrasive) at elevated speeds. This material is not harmful in itself, and the machinery is designed to work unaffected even with a considerable buildup. However, dust of any sort in an imaging system will rapidly compromise the quality of captured images. If a large fragment finds its way onto some part of the optical system, it will leave undesirable spots or streaks on the images, and a buildup of dust on optical surfaces will lead to a gradual decrease in transmission of images and a consequent loss of legibility or contrast in the captured image. To avoid such undesirable effects, we prefer—as an object hereof—to package the camera, illumination means and imaging optics in a single IMAGER unit which is hermetically sealed against dust.

The selection of the light source has a major impact upon the design of such an IMAGER unit, and factors such as the cost, service life, reliability and safety of a given light source have great impact upon its design. In previous work, we have favored the use of high-pressure xenon arc lamps, high-pressure tungsten-halogen incandescent lamps and multiply reentrant fluorescent lamps to address the lighting needs of particular document processors. Previous analysis had suggested that high-pressure tungsten halogen lamps were not preferable for providing sufficient light for use at higher document speeds,—but our latest designs, coupled with improvements in the amplification and processing of signals from the CCPD, indicate that this is now feasible. Tungsten-halogen lamps of this type offer various advantages over any other light source we have investigated for these applications. They are very efficient, produce light well-matched to the desired photopic camera response, are easily handled by unskilled personnel, are widely available and very attractively priced. They are also well suited to be applied in illumination systems utilizing an "integrating," "Lambertian" cylinder to provide intense, uniform illumination. Such is an object hereof.

Data captured from an imaging camera system of the type described is increasingly useful for tasks beyond the simple matters of document viewing and archiving. Various electronic systems are now being employed to read printed and handwritten data on financial instruments such as checks, with advantages for speedy, automated handling of such documents, as will be well understood by workers in the art. If such systems are to be employed, it is highly desirable that imaging cameras of the type described produce data in a consistent format which will not vary substantially from camera to camera. Such recognition systems rely heavily on tables and databases of previous "experience" and such data has maximum value if it is all rendered from images produced to a common format. Most important among the elements of such a format are consistent magnification and pixel size from camera to camera—that is to say, cameras of a given type should render details on the same document to the same size within a very small tolerance range. We prefer to set a tolerance on magnification of ±2% for the entire camera system, to ensure the best response and highest efficiency from the automated reading systems presently available.

Such a tolerance may appear liberal until it is understood that commercially-available optical components have typically very lose tolerances on optical parameters such as focal length and magnification. A tolerance of ±5% is not uncommon on a single component such as a lens, and camera systems of the type described may contain multiple optical components, each with a significant and additive tolerance. While closer tolerances may be obtained, they are always accompanied by higher cost (typically 3× to 6× the cost of the comparable commercial lens) and by the difficulties and risks associated with the purchase of custom-made components. We have found it preferable to design our camera systems with provision to adjust various components such that the desired tolerances of magnification and pixel size may always be achieved even with optical components having much larger individual tolerances.

Centration Error

A secondary and specific problem relates to a characteristic variation in commercially-available lens assemblies suited for use in such a camera. Such lenses all exhibit, to a greater or lesser degree, a random error known as "centration" error, which may be described as a variation between the physical and optical center lines of the lens package. This error will cause similar caner-as, constructed of identical parts other than their lenses, to "look" in different places. The source of this error is shown schematically in FIG. (6). It will be readily observed that a misalignment q between the mechanical axis of the lens M—M and the optical axis O—O will give rise to an error at the document face equal to (m)×(q), where m is the magnification ratio of the camera system. In systems of this type, the magnification ratio is typically between 7 and 10, so any error of centration at the lens could be magnified by as much as 10× when applied at the image plane. This is obviously a highly-undesirable condition for cameras which are intended to be easily assembled and replaced, since no two cameras will render the same image of the same document. In the worst case, it is possible that a camera might fail to see the top or bottom of a maximum-height document. As with variations in magnification/focal length tolerances, lenses may be purchased in which this error is minimized, but it is never entirely removed and the incremental cost is once again great—typically up to 5× the cost of the comparable commercial lens, and the additional costs for the desired focal-length/magnification tolerances need to be added to this. Once again, we prefer to eliminate this error by providing selected adjustments for certain elements of the camera which allow us to adjust this error to zero.

By means of the preferred adjustments to magnification, pixel size and centration, we may produce cameras containing individual parts with a wide range of tolerances which nevertheless render the same image of the same document, as regards both image position and pixel size.

Imaging technology as a means of improving document processing is presently under consideration in the art, e.g., as disclosed in U.S. Pat. Nos. 4,451,619; 4,246,808; and 5,089,713. Generally, such imaging involves optically scanning documents to produce electronically encoded images which are processed electronically and stored on high-capacity storage media (such as magnetic disk drives or optical memory) for later retrieval and display. It is apparent that document imaging can provide an opportunity to reduce manual handling and manipulation of documents, since electronic images may be used in place of the actual document.

This invention relates to such imaging e.g. teaching packaging a number of high-intensity, well-cooled, light-source means enclosed in a cylindrical integrating Lambertian cavity, and this housed, with associated optical and CCPD components, in a single, overall sealed IMAGER structure. The taught arrangement is preferably modular, allowing it to be easily installed into a relatively conventional existing object processing system. It will simplify manufacture and service by using a minimal number of common and easily installed components, and by avoiding the use of extensive assembly fixtures and like devices of high accuracy and cost. An object hereof is to address the various problems and difficulties described above and to provide the mentioned, and other, features and advantages.

The method and means discussed herein will be generally understood as implemented, constructed and operating as presently known in the art, except where otherwise specified; and with all materials, methods and devices and apparatus herein understood as implemented by known expedients according to present good practice.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements.

FIG. (1) is a front sectional view of a single preferred illuminator/camera assembly embodiment including an integrating Lambertian cylinder, enclosing lamp means and packaged in a housing which also contains and positions light-conducting means and image capture means (CCPD and associated optical means); while FIGS. 1A, 1B functionally illustrate such a cylinder

Figure 1:
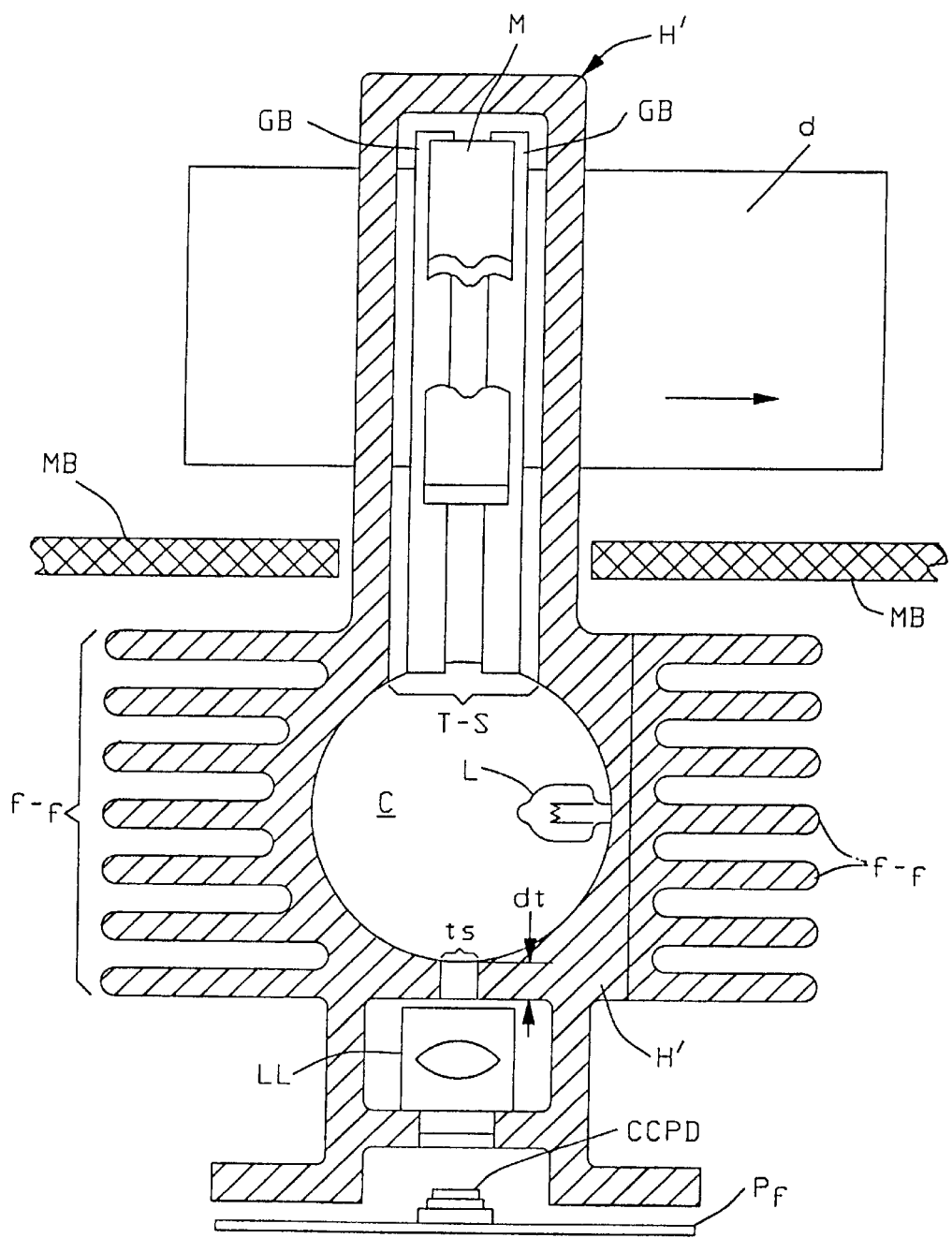
FIG. 1C shows such in combination with camera means.
Figure 2:
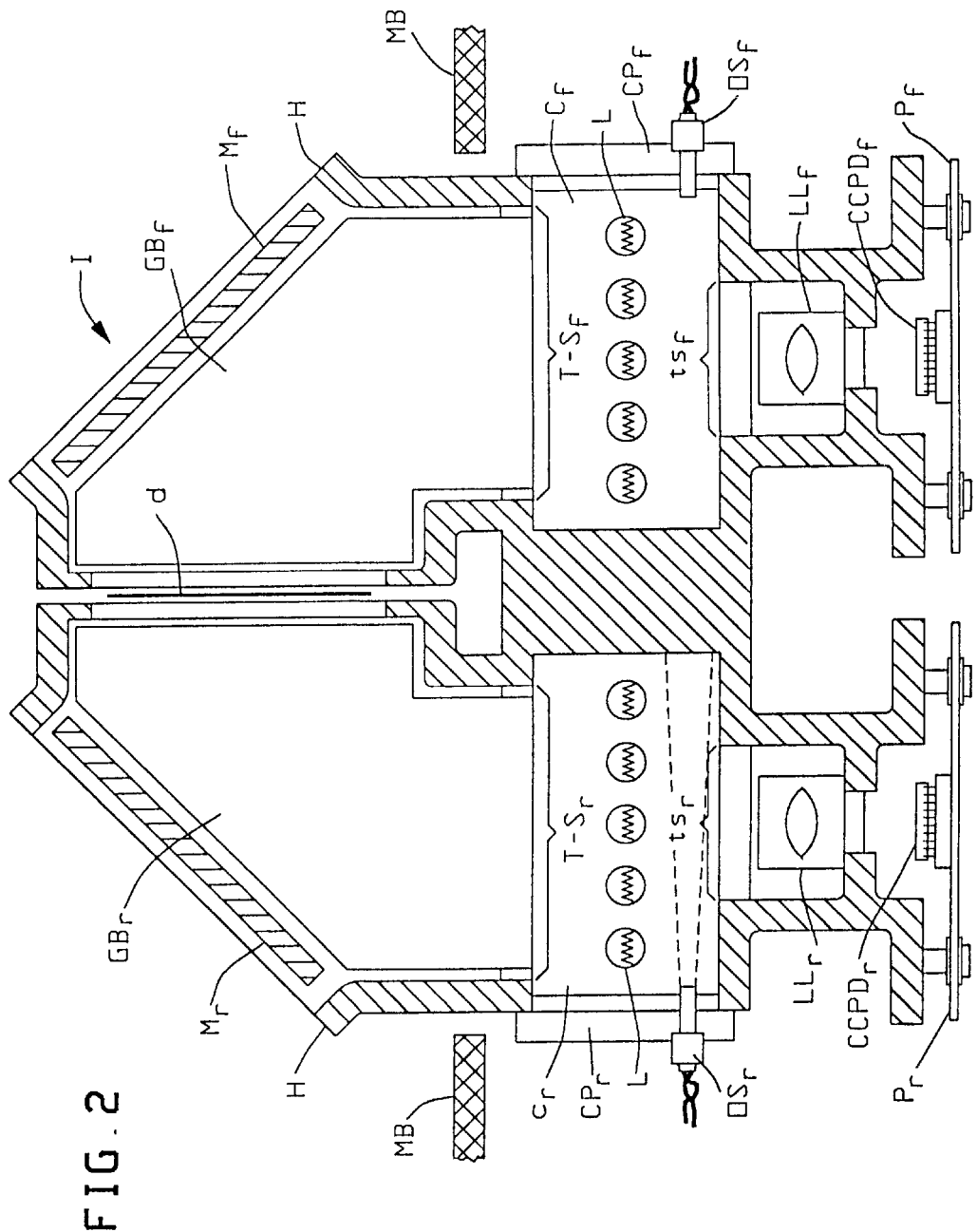
Figure 3:
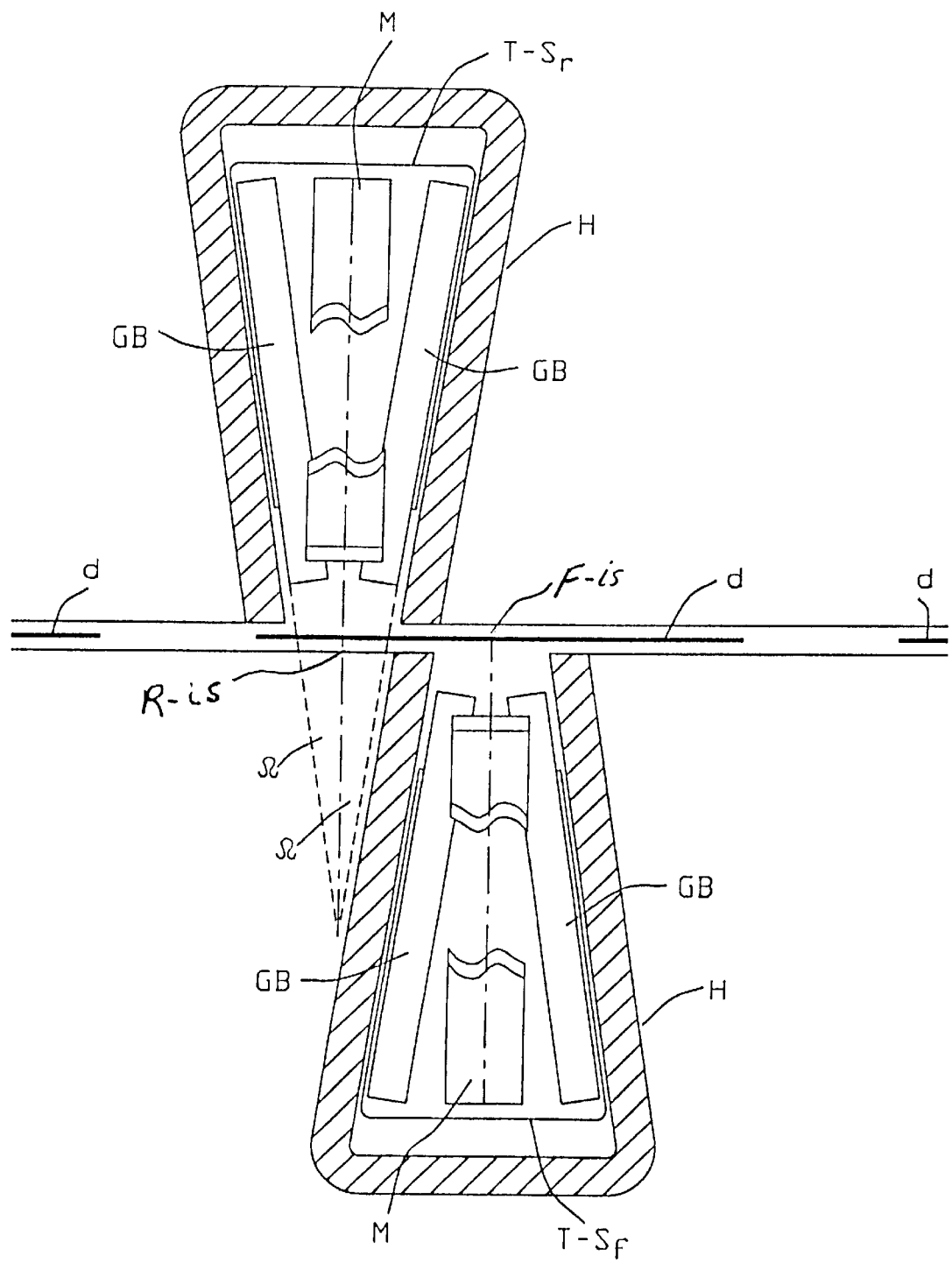

FIG. (2) is a side-sectional view of a pair of like (twin-) illuminator/camera assemblies, with a pair of said cylinders, plus associated light-conducting means and image capture means, combined in a single IMAGER unit;

FIG. (3) is a plan view of the twin arrangement of FIG. 2;

FIG. (4) is an isometric view showing the front section of the camera shown in FIGS. 1–3;

FIG. (5) is a schematic showing an imaging optical path for the camera of FIGS. 1–4;

FIG. (6) schematically illustrates the aforementioned phenomenon of "centration error" and how it arises; and FIG. (7) shows an isometric view of an alternative construction of an illuminator/camera (IMAGER) assembly in which a single glass block is employed to perform the functions of multiple glass blocks and mirrors. This construction is otherwise identical in nature and intent to that described in FIG. (1).

DESCRIPTION OF PREFERRED EMBODIMENT

Overall document processor concepts will be discussed; followed by details of our preferred illuminator/camera embodiment.

General Concept of Preferred Embodiment

Figure 1A:
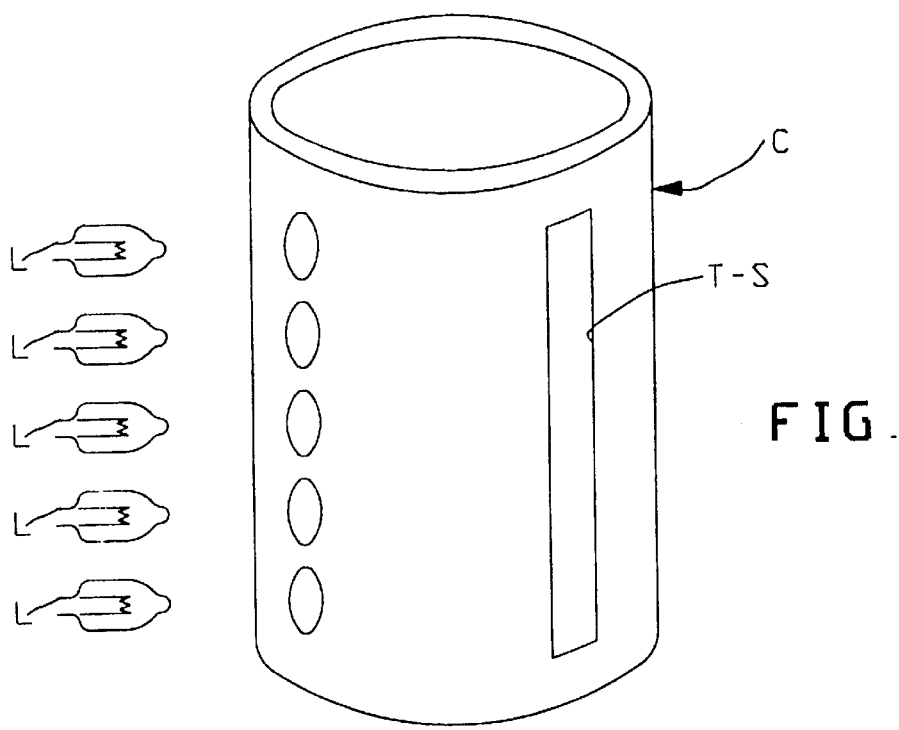

FIG. 1A simplistically shows an integrating Lambertian illumination cylinder unit C that is here preferred. Unit C will be understood to provide a light source that we have characterized as a Lambertian emitter distributed in a linear fashion. The output will appear as an incoherent source of monochromatic or panchromatic light emitted from an aperture T-S which has a relatively high aspect ratio (length to width ratio). The internal source(s) of luminance may be derived from such light sources as; incandescent bulbs, fluorescent lamps, gas discharge lamps, laser sources or other optically pumped emitters or from other luminous sources such as the output of a fiberoptic bundle—but here we prefer tungsten-halogen lamps. The placement of the source(s) is not critical, but may impact output uniformity. The intensity profile as a function of distance from the exit aperture is very uniform and predictable and allows for a considerable "depth of illumination". Components comprising the disclosed light source are readily available, easily manufactured from standard materials and do not rely on the critical placement of any other component.

Method of Operation

Figure 1B:
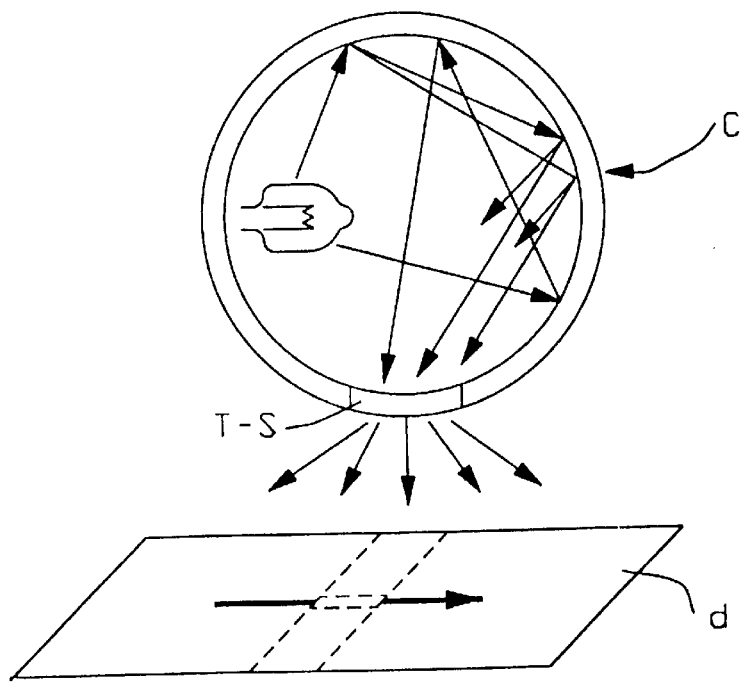
Figure 1C:
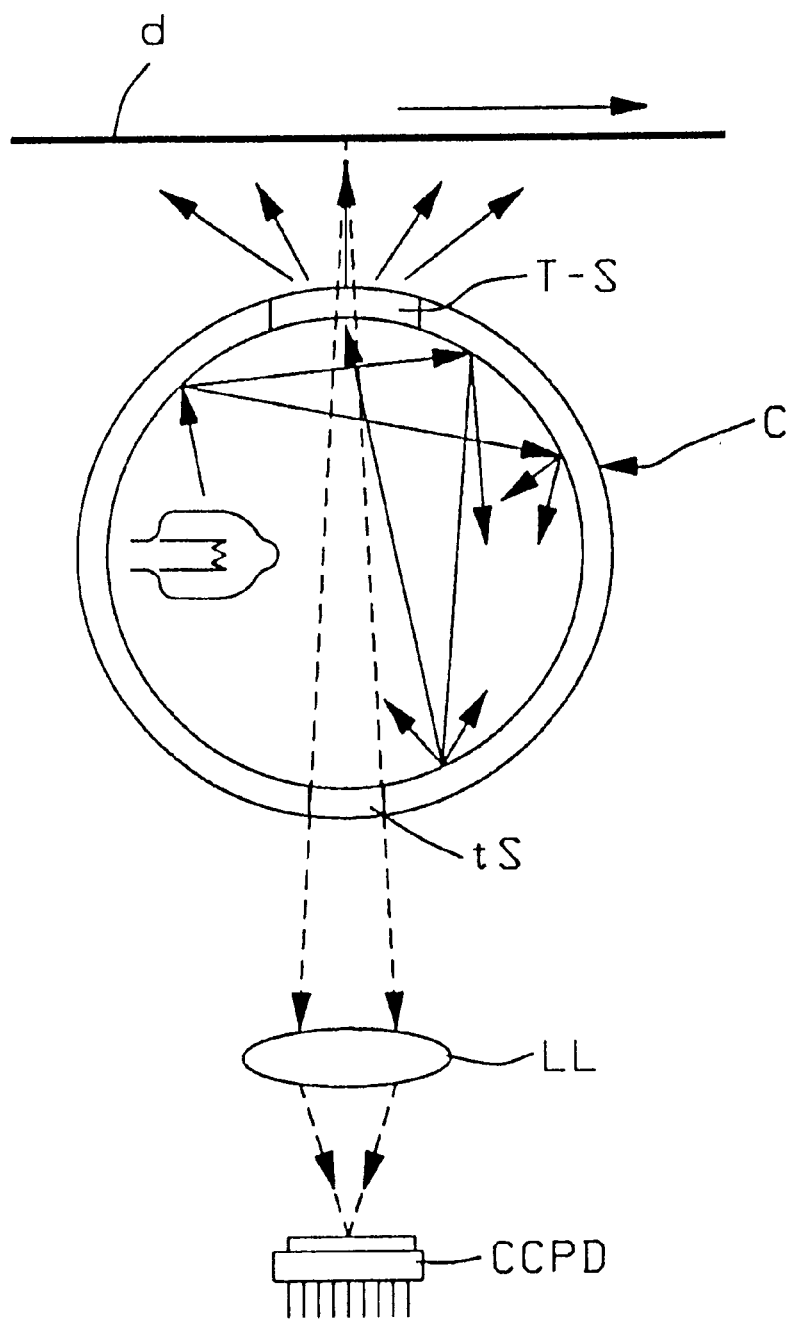

A typical application for this light source is viewed in FIGS. 1A, 1B where:

a) A hollow cylinder is provided with an aperture T-S cut along its length and circumferentially offset from a series of circular apertures which allow for the intromission of an array of incandescent light sources, L;

b) The cylinder interior is coated with a high reflectivity Lambertian (diffuse) reflector-film;

c) The assembly is placed in proximity to a target document d (FIG. 1B) requiring uniform illumination while in motion with respect to the cylinder and d) Light emitted from the source(s) L is reflected and scattered with very little loss throughout the entire internal cavity of the cylinder, eventually finding egress at the exit aperture; T-S Proposed Application One possible arrangement of this proposed light source is shown in FIG. 1C. This end view of the cylindrical source shows;

a) The hollow cylindrical body with its interior coated with a high reflectivity, diffuse material;

b) One of the (potentially many) light sources L used to illuminate the interior of the cavity and having multiple reflections before it exits the cylinder;

c) The "slit" of light positioned in proximity to a document, or other relatively flat object, traversing perpendicular to the axial orientation of the cylinder;

d) The light reflected off the object d returns back through the Exit Aperture, T-S, then through a Viewing Aperture ts to an Image Lens and is imaged on to the linear array of a CCPD Detector Array (Camera);

e) The scan rate of the CCPD Camera is is synchronized to the linear velocity of the object so as to take repeated "slices" of the object as it passes in front of the light source.

Advantages of Proposed Light Source

Lambertian characteristics of this light source C; it inherently produces a uniform and glare-free means of illumination—and no focusing of illumination beam needed.

There is no limit on the length of the exit aperture T-S, therefore providing an unlimited, uninterrupted, uniform source of illumination. Fluorescent lamps approach this affect but are limited to maximum lengths of about 96 inches before another lamp is overlapped or butted to the end of the previous one. Slit T-S can be long, while the lamps used are small;

The luminous sources (lamps) L in the cylinder can be selected to optimize system performance by using incandescent sources if an "Infrared-rich" light source is needed; fluorescent, if a "cooler" light source is needed; Ultra-Violet if a UV source is required; or any selection of other possibly monochromatic sources depending on the system application and demands. The output from all such sources of internal luminance is integrated in the cylinder to produce a single, uniform beam of light.

Cylinder interior may be coated with a phosphorescent material (instead of the white reflecting material) which, upon excitation from an appropriate source, will provide a similar uniform output. The color selection of the phosphor may also lend itself to optimizing system performance.

Congruence of the illumination path with the imaging path facilitates simplified, compact packaging—i.e. image can return along illumination-path All illumination is "indirect" (e.g. document can never "see" filament).

First Embodiment, FIG. 1

FIG. 1 shows such an integrating Lambertian cylinder C and associated CCPD, lens etc., all packaged into one housing H' which is also adapted—according to this embodiment—to house optical guide means gm (glass block GB, GB, and associated mirror surface M) which optically couples aperture T-S to the imaging site where documents d are driven past. By a further feature, housing H' is adapted to protrude thru a transport platform MB so that only guide means gm lie above MB, while the rest of housing H' lies below (on the other side).

Figure 4:
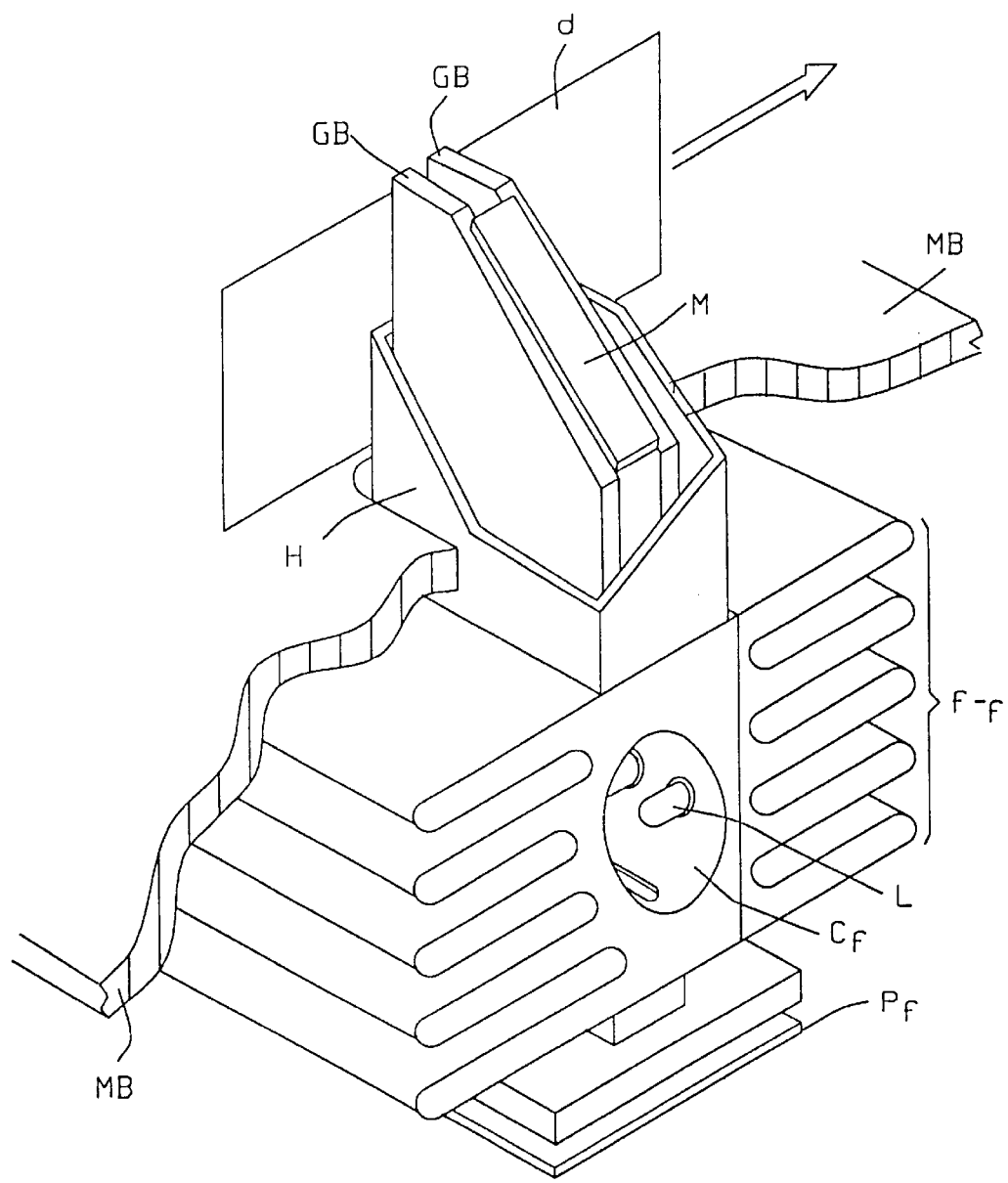

FIGS. 2–4 depict a twin illumination/camera (IMAGER) unit system according to our preferred embodiment. This IMAGER will be understood as consisting of two essentially identical camera assemblies (e.g. each as in FIG. 1) combined into a single system, one for the front of the document, one for the rear, [like elements in each camera are differentiated by the subscript "f" for "front" and "r" for "rear".] This IMAGER comprises an integrating housing H, with two source-integrating cylindrical Lambertian cavities C therein. Housing H incorporates (packages) both illumination means, camera means, and associated light-coupling and image-coupling means (e.g. glass blocks GB and image mirrors M) for directing light from each cavity C to passing documents and likewise coupling the images reflected from the documents back through the cavity to imaging means (e.g. CCPD) coupled thereto.

Each "integrating" cavity C consists of a cylindrical cavity, open (and capped) at one end and closed at the other, fashioned in housing H. The open end is closed by separate cover CP, permanently fastened to housing H, thus forming a true closed cylindrical cavity.

Glass blocks GB, fitted onto housing H, (preferably two for each cavity, see below and FIG. 3), act to optically guide illumination from cavity C to the imaging site and back. Image mirrors M, also fitted to housing H, act to optically reflect and direct the image of the document back into housing H, through cavity C and, via image-forming lens means LL, onto imaging means CCPD. As a feature hereof, glass blocks GB and mirrors M will be seen to advantageously allow source-integrating means, illumination sites and camera hardware to be remotely mounted from the imaging site and physically isolated therefrom, (e.g. preferably under platform MB), thus preventing the entry of dust and debris into this hardware, facilitating repair-access, and isolating the units thermally and optically.

As will be evident from FIG. (2), one cylindrical cavity, Cf, may be used for illumination/detection of the front face of the document, while a second like cavity, Cr, may be used for illumination of the rear face in like manner.

Each cylindrical cavity C contains an array of one or more lamps L each preferably a like tungsten-halogen incandescent lamp. Our preferred embodiment shows five such lamps; however more or less, of varying power, could be employed depending upon the requirements of any given application. Along the side of each cavity C in housing H is a long, narrow illumination slit T-S adapted to admit a maximum of "integrated light: from the interior of the cylinder C to respective glass blocks GB, GB and thence to the face of the document d to be illuminated. The image of the illuminated document passes back thru glass blocks GB-GB, then it is reflected by image mirror M back through the same illumination-slit T-S, through the cavity C and beyond, into a second, smaller imaging-slit ts, and thence to lens means LL and camera (CCPD) means.

Figure 5:
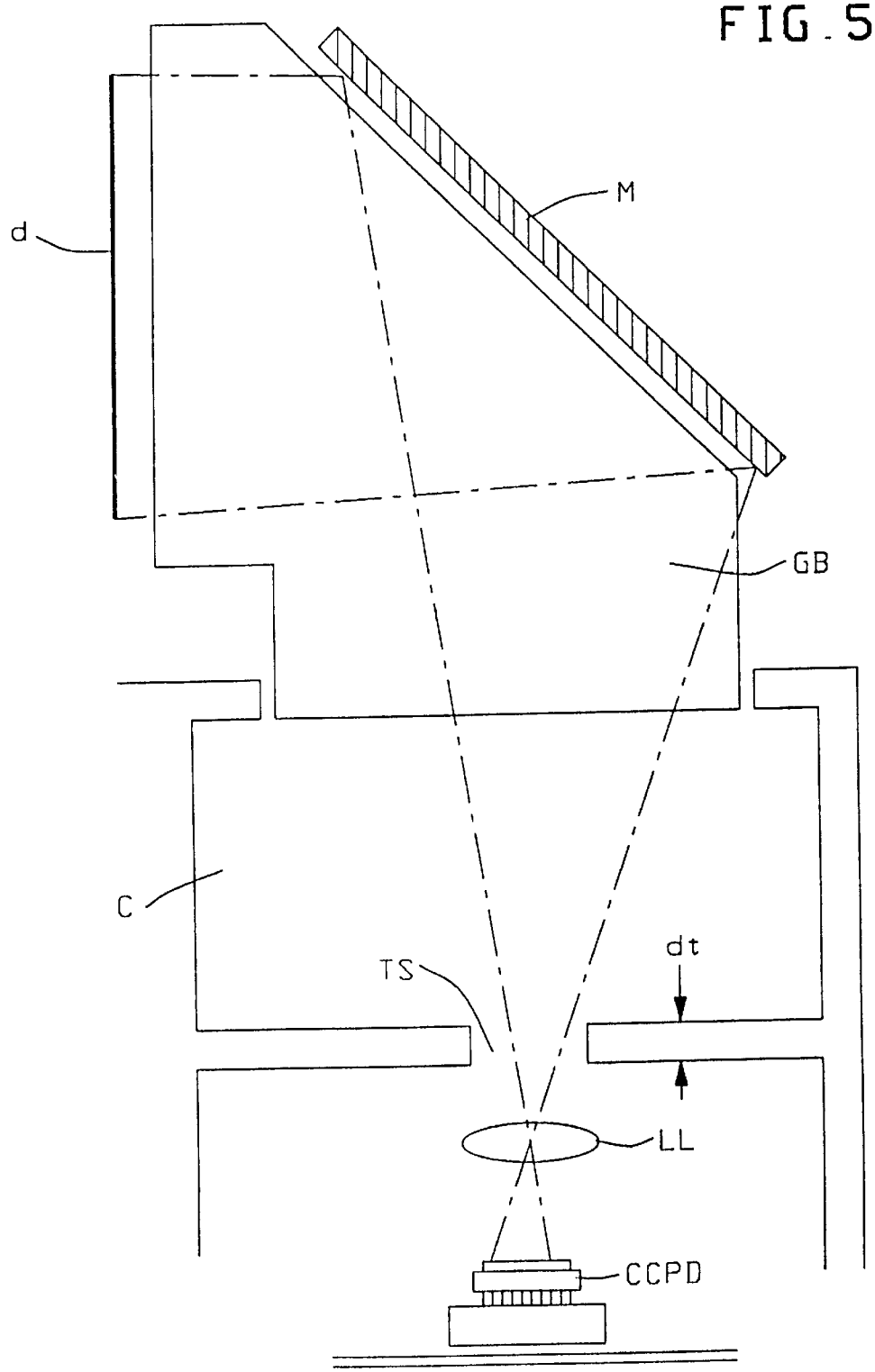
Figure 6:
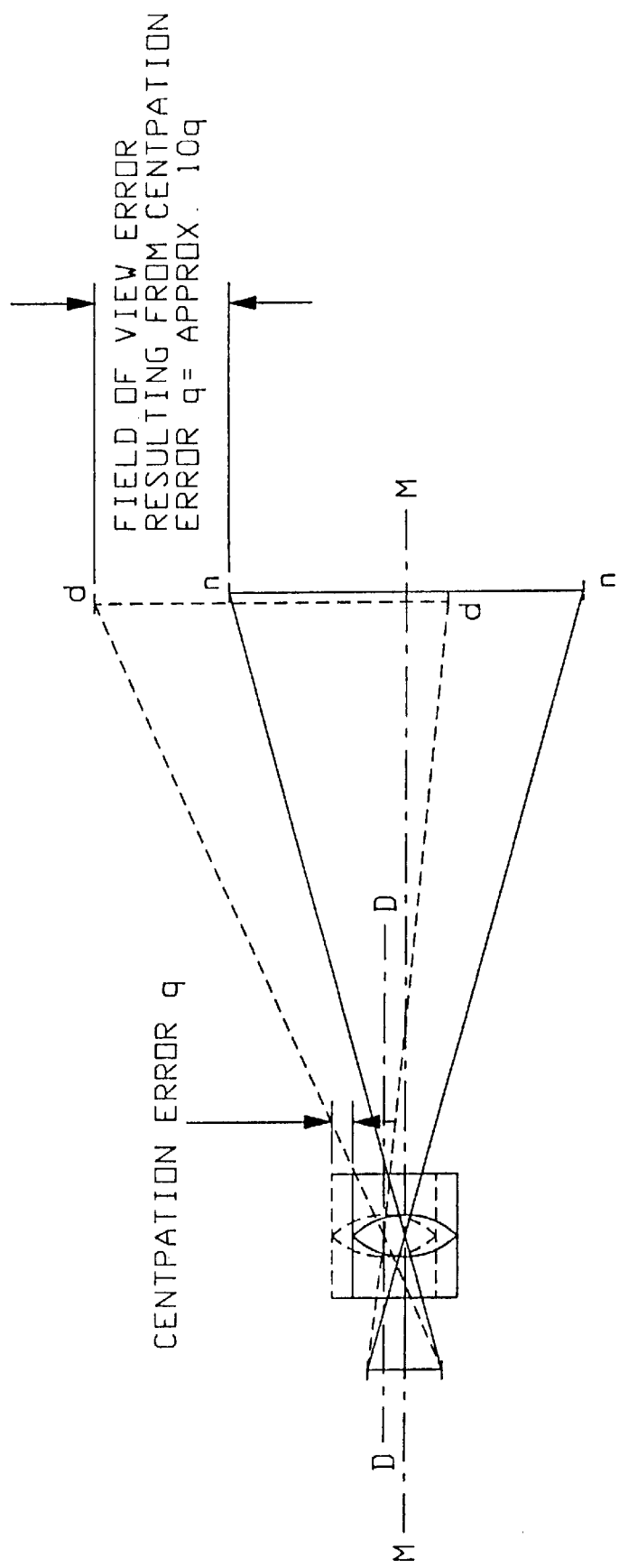
Figure 7:
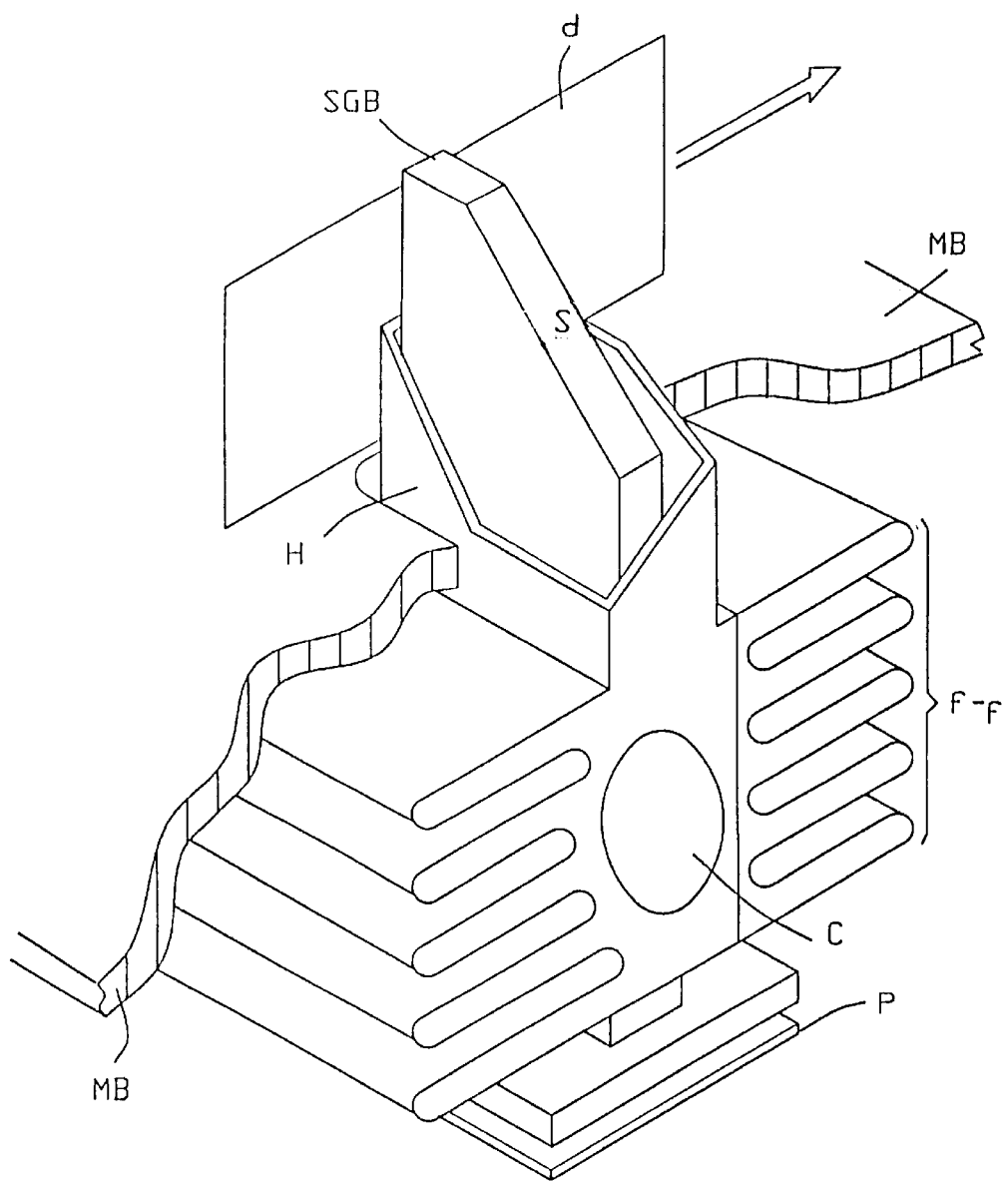

As a feature of optimization, this image aperture ts should have a width approximately that of the CCPD and should be arranged to pass only reflected images (from documents)— essentially barring passage of any raw, non-image light from the cavity; i.e. aperture ts will be "dark", or opaque to all direct illumination from its cavity. To help make it "dark", aperture ts will preferably have anti-reflective sides (e.g. roughened, or with fins, etc.) and have a rather collimating length dt (e.g. here 3–4" or more, see FIGS. 1, 5; where cavity wall is about ¼" thick). Also, opposing illuminating-aperture T-S will include glass blocks which have anti-reflective ends facing the cavity, to minimize reflection to imaging-aperture ts.

It will be noted, in FIG. (3), that two glass blocks GB are shown disposed at equal angles $\Omega$ about the optical center-line of the camera. We find that optimal and consistent illumination across the full width of the track is a function of track width, size and width of glass blocks GB and pf the distance between them, the type and intensity of illumination and the type and characteristics of the glass block material. We find that the illumination may be advantageously shaped and formed in the area of the imaging site by increasing or decreasing angle $\Omega$ to produce the most consistent result. Workers in the art will readily understand that the multiple variables at play in this area make analysis of the construction most complex, and that the best angle for $\Omega$ (if other than 0) will be found by careful experiment. This is not to specify that angle $\Omega$ need necessarily have any value other than 0, but rather to say that illumination may be beneficially impacted by careful experiment and control of this angle.

The housing H containing cavities C is preferably made of aluminum alloy, and the interior surfaces which form integrating cavities C are preferably at once highly reflective and also highly diffusing, a dual property we characterize as "Lambertian reflectance". Such reflecting surfaces will also diffuse and integrate the light from all the individual lamp means and, by means of many internal reflection paths, produce at the glass blocks GB, GB non-directional illumination of uniform intensity in which the individual light sources are no longer discernable, and their contributions are well intermixed and "integrated".

Such a reflecting surface is preferably obtained by coating with a highly diffuse reflecting medium having a matte finish. We prefer to use Barium Sulfate, carried in an inorganic binder; it may readily be applied to the cavity (preferred aluminum alloy) surfaces to provide a nearly perfect Lambertian surface at moderate cost. While housing H is preferably unitary, it may also be divided (e.g. one front, one Rear; or unitary with separate front, rear optical guide means).

An alternative construction is also possible as shown in FIG. (7), wherein the two glass blocks GB, GB, described above, are replaced by a single glass block, SGB,—one for each illuminating cavity C. Such class blocks will be understood as provided with mirror coatings and as serving as an illumination-coupling means for conveying light from the cylinder C to the face of the document, and also for conveying the image of the document back through the cylinder to the lens and CCPD means.

This alternative construction will be understood to be identical in all respects to that already described, and to be described subsequently, save only the differing detail of the construction and application of the single glass block. Such a construction may produce a camera assembly with fewer parts (such as mirrors, mounts and the like) and a smaller profile in the area above the cylinder.

These advantages should be weighed against the increased cost and complexity of such a single glass block, which must incorporate high-precision mirror means and selective application of reflective coatings, as well as being larger and heavier that the two individual glass blocks. We do not believe that there are significant variations in performance between the two designs; thus, selection of one over the other, can be made based upon the particular parameters of the design, as understood by workers in the art.

In the embodiments of FIGS. 1–4, documents d may be transported above one surface of a machine base-plate is structure or platform MB, past the site of image capture (e.g. between front and rear glass block means GB as FIG. 3), while associated front and rear integrating cylinders Cf, Cr, lamp means, lens means and CCPD means are located below base-plate MB and isolated from one another, from affecting documents and from the entry and build up of dust, debris and the like. Such remote disposition of lamp, lens and CCPD means also permits them to be easily accessed for service and repair without need to disturb components on the upper face of base-plate MB, where typically extensive high-speed rotating machine elements are disposed to drive and direct documents d.

Construction of Illumination Means

Illumination within each cylinder cavity C is provided, preferably, by an array of tungsten-halogen incandescent lamps L, which are chosen for their well-adapted spectral characteristics, ready availability, moderate cost and excellent reliability. Further, by using multiple, low-cost lamp means, available in a wide range of illumination outputs within the same interchangeable package style, we may custom-tailor illumination to a given set of circumstances by selecting more or fewer lamps of varying output to give the exact intensity of illumination desired. Additionally, the use of multiple lamps permits us to introduce some redundancy into our system—e.g. adding an "extra" lamp to provide a margin of illumination over what is required, and allowing sensing of the failure of a lamp by electronic current-measuring sensing means (not shown, but well known in the art), to occur without "downtime". That is, we may construct a system whereby the camera may continue to function (within parameters) after one lamp fails; while the unit can report lamp failure to the controlling electronics and warn the attendant to service the lamps at the next convenient opportunity.

Cavity Sensor

As a further feature of advantage, we prefer to add an optical sensor OS which views some part of the cylinder wall (not looking directly at any of the lamps) and directs its output signal, OSS, from that sensor to some signal-conditioning means (not shown, but well understood in the art). In FIG. (2), optical sensors OS are shown mounted in each cover plate CP, (sensor Cr in cover Cpr, sensor Cf in cover CPf). But this is merely a schematic representation—the sensor may be mounted in any convenient position where it has an unobstructed view of the wall of the cavity C, since the highly integrating nature of the cavity means that any part of its wall has the same brightness as any other part. The signal conditioning circuitry should have been initially calibrated against a known reference; it can then be used to optimally adjust lamp current to give the right amount of light. In this way, optimal illumination may be derived, to secure the best and most consistent response from the CCPD, while at the same time minimizing lamp current (thus maximizing lamp life, as well-understood by workers regarding incandescent lamps) and minimizing power consumption and therefore undesired heating of the camera assembly.

Lamps

In our preferred embodiment, we prefer the use of 5× 35-Watt tungsten halogen lamps, which we find give adequate illumination for the particular application we have in mind, (e.g. where document speed is the order of 300 ips.) Of course, the total illumination required may be greater or less, depending upon document speed, and this may be accommodated by using lamps of the same package dimensions but of higher or lower power, or by adding/omitting one or more of the lamps, or a combination of both. A feature of advantage of the integrating cylinder design is its ability to integrate the output of multiple point-sources of illumination to the point where the individual sources are not discernable in the final output of the cylinder. This effect holds true for a wide range of combinations of lamp power and number of lamps.

For ease of construction and service, we prefer to construct the illumination means as a separable assembly, containing lamps, mounting means, electrical connection means and cooling means in a single, integrated assembly. In this manner, when warned of a lamp failure, an attendant need not take time to determine which lamp has failed or why—but may simply remove and replace the entire illumination assembly with a minimum of delay. Later, the removed assembly may be re-lamped and serviced at some convenient opportunity. In this way, we ensure maximum productive uninterrupted use of the document-processing system.

Lamps of this type typically convert a considerable part of their power consumption to heat, and a large part of this is transmitted through the body of the lamp to the mounting and connection means. For this reason, our preferred separable lamp assembly is provided with multiple cooling fins, f—f, so disposed as to lie within the airflow of a separate cooling fan, (not shown, but well understood in the art). A certain amount of heat is also generated in the main housing H, by conduction from the lamp assemblies and also as a result of reflective loss at the inner surfaces of cylinders C. Housing H is therefore also preferably provided (e.g. FIG. 4) with cooling fins f—f, disposed to lie within the airflow of some (e.g. the same) cooling fan (e.g. see FIG. 1).

Other details and features of advantage.

In our preferred embodiments, we have found it desirable to offset the illumination and mirror means of the front and rear cameras a certain distance from one another along the document track, typically about 1.75". This offset serves to ensure that the illumination from one camera assembly does not interfere with the other; e.g. produce uncontrolled or undesirable responses in the other camera. It also allows for the provision of document-driving and controlling means (not illustrated, but well-known in the art) between the two camera imaging sites, arranged and adapted to maintain prescribed document speed and location, and to improve document control and therefore document image quality.

Workers in the art are aware that the spectrum falling upon the CCPD means may not be optimized for best resolution and rendition of the document image, as discussed above. We find that it may be desirable, under certain circumstances, to incorporate into the camera assembly a trimming optical filter (FiL—details not shown, but well understood in the art) to selectively shape the spectral characteristics of the light falling on the CCPD to optimize CCPD response. Such a filter, where employed, would preferably be placed as close as possible to the lens means LL, since the image is at its smallest at this point and this will minimize the use of costly custom-coated optical filter materials.

In other cases, we have found it feasible to adapt the reflecting/diffusing coating of the inside surfaces of cylinders C to attenuate and/or modify certain wavelengths from the lamps to give a desired spectral output from the cylinder (and therefore to the CCPD) which more closely matches the desired ideal. In such cases, a trimming filter may not be required.

In order to eliminate the effects of tolerances within the optical components (such as tolerances of magnification and centration, as previously discussed) we preferably construct the CCPD and its associated electronics to be adjustable in various axes in order to compensate for, or eliminate, these various errors. One such construction is described in U.S. patent application Ser. No. 08/064,606, filed May 19, 1993, (and incorporated herein by this reference), adapted to give sufficient range of adjustment for this application.

Reprise

While integrating illuminating-cylinder arrays are here taught as particularly advantageous for use with automated, high-speed document imaging scanners, workers will appreciate that they have utility for other, analogous applications, such as for high-speed imaging or copying, optical character illumination and/or recognition, traditional "photographic" imaging, or wherever a highly intense, highly uniform, yet diffuse source of illumination is required, and the source is "masked" so as not to be directly "viewed" by a subject or by the camera.

We considered making the integrating cavity spherical, but for reasons of practical application to the task of linear illumination, we prefer a cylindrical cavity, with multiple lamp source(s) disposed therein to induce multiple reflections off the inner walls before emission to the document site (vs. direct illumination from lamp to document, without cylinder wall reflection). In this way, we achieve highly intense, highly uniform, yet diffuse, illumination which is particularly apt for illuminating documents and minimizing any "shadowing" effects (e.g. from creases and folds.) We have previously contemplated the use of a highly randomized glass-fiber bundle, combined with an accurately focused arc-lamp illumination means, to achieve the above results (e.g. see our U.S. Pat. No. 5,003,189), but find that our preferred illuminating cylinder construction can give superior performance (under certain circumstances), yet at much reduced cost. Other forms of indirect illumination are suggested in U.S. Pat. No. 4,769,718, although not with an integrating cylinder or the like.

In conclusion, it will be understood that the preferred embodiment(s) described herein are only exemplary, and that the invention is capable of many modifications and variations in construction, arrangement and use without departing from the spirit of the claims.

For example, the means and methods disclosed herein are also applicable to other, related illumination tasks, both in other imaging-type systems and to meet other requirements for illumination.

The above examples of possible variations of the present invention are merely illustrative and accordingly, the present invention is to be considered as including all possible modifications and variations coming within the scope of the invention as defined by claims appended hereto.

What is claimed:

1. A method for illuminating and imaging a plurality of objects which are rapidly and continuously transported past at least one station, the method comprising the steps of:

providing prescribed illumination means for illuminating said station;

arranging said illumination means to include an integrating structure with at least one cylindrical, integrating Lambertian reflecting/diffusing cavity, the cavity having diffusely-reflecting walls and output port means;

providing at least one light source means in the cavity so as to generate and project a highly intense beam of illumination onto said walls to be diffusely reflected thereby and sent to exit at said output port means, said light source means comprising at least one set of lamps, each set of lamps integrated into a single removable assembly and disposed so that no lamp directly views said stations; and arranging said output port means to include optical guide means including glass block means incorporated therein for coupling the diffusely-reflected light to illuminate said objects at said station, and for coupling a reflected image of said objects back into and through said cavity for imaging thereof.

2. A method of illuminating a plurality of objects being transported past at least one station, wherein the stations are arranged to have a prescribed respective imaging-site, the method including the steps of: projecting a non-specular imaging beam from prescribed source means to illuminate the objects passing at said imaging-site, arranging said source means to comprise:

at least one set of lamps, the set of lamps being integrated into a single removable assembly, being disposed so that no lamp directly views said imaging-site, and comprising at least one or more individual lamps, in a respective integrating Lambertian cavity; an optical glass block coupling means adapted to project an illumination of said lamp to said respective imaging-site, and back therefrom through said cavity; the lamp being adapted to direct all the illumination to an inner wall of said cavity for Lambertian reflection/diffusion/integration for issuance from said cavity as said imaging beam, said inner wall being adapted to integrate, reflect and diffuse all the light incident upon it to said optical glass block coupling means in Lambertian fashion.

3. In an object-processing imaging system wherein a plurality of of objects are transported past at least one imaging station, to be imaged by a camera associated with the imagine station, each imaging station having an associated imaging-site, a method of providing illumination of the objects, the method comprising the steps of:

projecting a respective Lambertian illumination beam from prescribed source means to said imaging-site, said source means comprising at least one set of lamps, each set of lamps integrated into a single removable assembly and disposed so that no lamp directly views said imaging-site; providing means for optically coupling object images from said imaging-site through said coupling means to said camera means, said coupling means including a glass block; arranging said source means to comprise a Lambertian integrated cavity with said set of lamps disposed therein and to have Lambertian reflecting/diffusing inner cavity-wall means adapted to project, through an associated illumination slit, a highly-diffused, highly uniform non-specular, Lambertian illumination beam to said imaging site and back, and arranging said coupling-means to include reflector mean to receive an image reflected from said object back through said Lambertian cavity then out, via camera-slits provided therein, to said camera means;

said camera means being incorporated with the source means in a common housing, being optically coupled via said coupling means to an associated image-slit in cavity walls so that the reflected image is passed back from said object through said illumination slit, through said cavity and through said image-slit to said camera means.

4. A method for illuminating and imaging an object, the method comprising the steps of:

providing a light-integrating cavity having a plurality of diffusely-reflecting walls, and an illumination-slit through which a non-specular, Lambertian beam of intense, uniform light is to be projected to said object from said cavity;

providing source means arranged and adapted to project prescribed illumination onto said walls, to be diffused and reflected thereby, and to form said Lambertian beam; said source means comprising at least one set of lamps, each set of lamps integrated into a single removable assembly and disposed so that no lamp directly views said object;

providing glass bock optical coupling means coupling said Lambertian beam to said object;

providing camera means and associated image-port means through said cavity wall arranged and disposed to pass an object image, reflected back through said coupling means, said illumination-slit and said cavity, to said camera means; and disposing said illumination slit opposite said image port means, and in-line therewith;

said camera means being incorporated with the source means in common housing means, being optically coupled via said coupling means to said associated illumination-slit in said cavity walls to that reflected images are passed back from said object through said cavity and back through said illumination-slit to said camera means.

* * * * *